United States Patent [19]

Glaser

[11] Patent Number: 4,643,750
[45] Date of Patent: Feb. 17, 1987

[54] METHOD AND APPARATUS FOR PRODUCING GLASS FIBERS

[75] Inventor: Hellmut I. Glaser, Granville, Ohio

[73] Assignee: Owens-Corning Fiberglas Corporation, Toledo, Ohio

[21] Appl. No.: 649,955

[22] Filed: Jan. 16, 1976

Related U.S. Application Data

[63] Continuation of Ser. No. 523,400, Nov. 13, 1974, abandoned, which is a continuation of Ser. No. 203,797, Dec. 10, 1971, abandoned, which is a continuation of Ser. No. 851,790, Aug. 21, 1969, abandoned.

[51] Int. Cl.$^4$ ............................................. C03B 37/09
[52] U.S. Cl. ................................................ 65/2; 65/1; 65/5; 65/12; 65/16; 264/169; 264/176.1; 425/72.5
[58] Field of Search ......................... 65/1, 2, 12, 5, 16; 425/72; 264/169, 176 F, 48

[56] References Cited

U.S. PATENT DOCUMENTS

| 2,821,744 | 2/1958 | Spohn et al. | 425/72 |
| 3,248,192 | 4/1966 | Millet | 65/5 |
| 3,257,181 | 9/1966 | Stalego | 65/12 |
| 3,275,720 | 9/1966 | Ohsol | 264/48 |
| 3,311,688 | 3/1967 | Schuller | 264/176 F |
| 3,573,014 | 3/1971 | Strickland et al. | 65/1 |
| 3,829,301 | 8/1974 | Russell | 65/2 |

Primary Examiner—Robert Lindsay
Attorney, Agent, or Firm—Ronald C. Hudgens; Kenneth H. Wetmore; Hiram P. Settle

[57] ABSTRACT

This invention pertains to a method and apparatus for forming glass fibers by flowing fine streams of glass from closely spaced orifices in a feeder plate while directing a cooling gas upwardly to promote separation of the streams of glass and eliminate the tendency of the molten glass to flood at the feeder plate.

13 Claims, 11 Drawing Figures

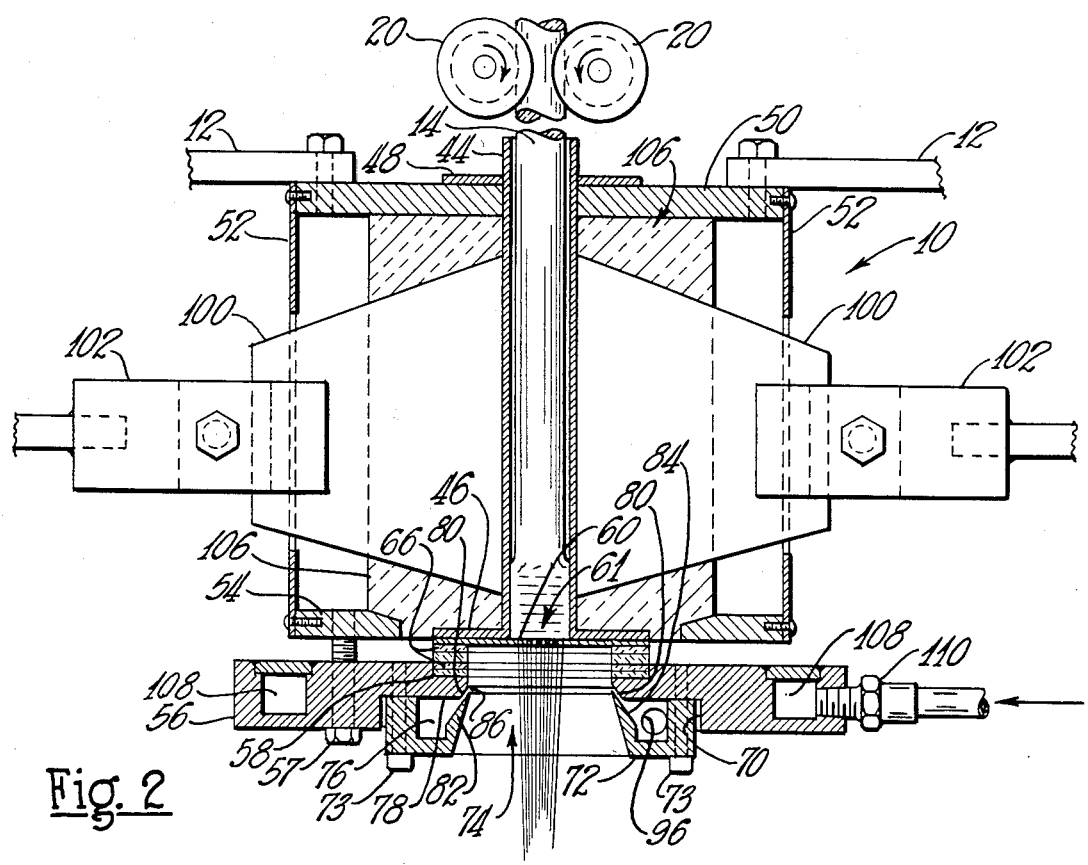
Fig. 2
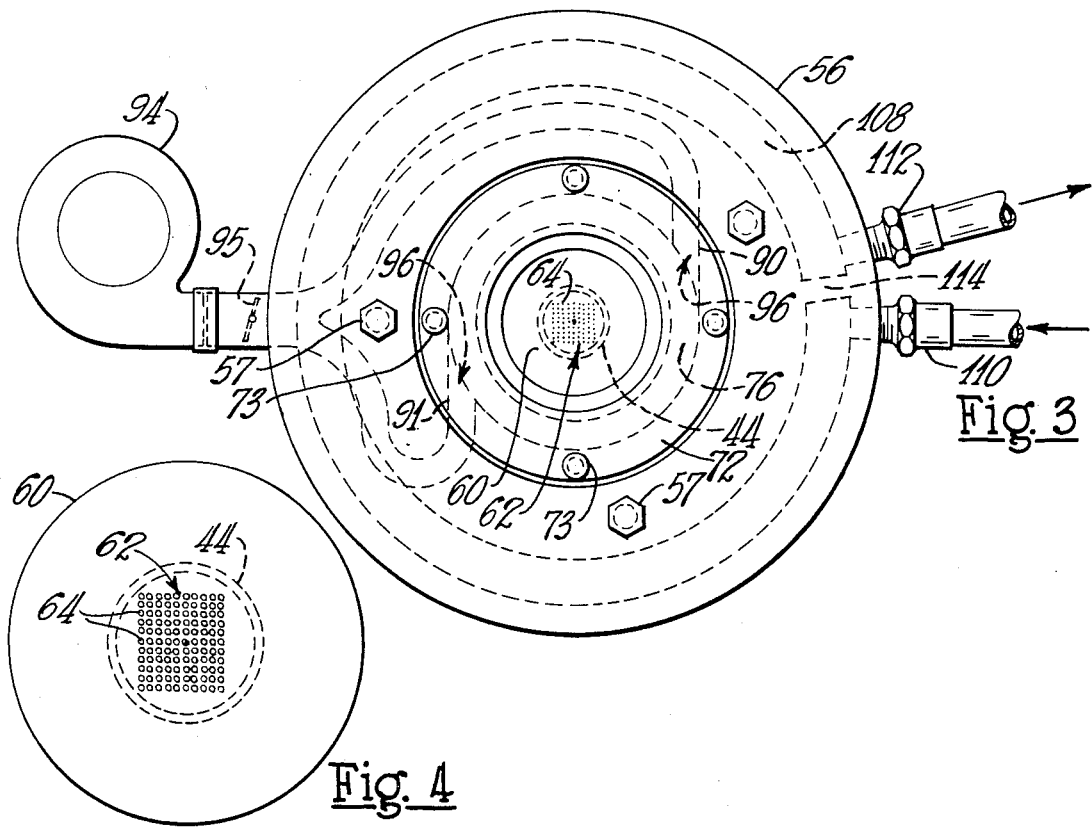
Fig. 3
Fig. 4

METHOD AND APPARATUS FOR PRODUCING GLASS FIBERS

This is a continuation of application Ser. No. 523,400, filed Nov. 13, 1974, now abandoned, which is a continuation of application Ser. No. 203,797, filed Dec. 10, 1971, now abandoned, which is a continuation of application Ser. No. 851,790, filed Aug. 21, 1969, all now abandoned.

This invention relates to a method of an apparatus for processing glass and more especially to a method of flowing fine streams of glass from openings or orifices in a feeder plate under an environment and conditions wherein the individual streams may be attenuated to continuous filaments and the tendency for the glass to flood at the feeder plate substantially reduced or eliminated.

It has been a practice in the formation of fibers or filaments from heat-softened glass to flow a plurality of streams of glass from a supply in a stream feeder or bushing through passages or orifices provided in projections integral with and depending from the floor of a feeder, and orificed projections being spaced a substantial distance one from another whereby individual or discrete streams are formed which may be attenuated to filaments, the spaced apart projections tending to prevent flooding of the glass over the stream delivery section of the feeder.

In arrangements of this character for flowing a substantial number of streams of glass to provide a substantial number of filaments in a strand, a comparatively large stream feeder is necessary to accommodate the spacing between adjacent orificed projections in order to prevent flooding, and in order to facilitate the formation of beads of glass which fall by gravity with attendant trailing filaments which are manipulated by the operator effect winding of a strand of the filaments upon a rotating collector to form a package. A stream feeder or bushing of this character is necessarily of comparatively large size and, being fashioned of platinum or an alloy of platinus, renders filament production expensive particularly where a large number of filaments are grouped in a single strand. The conventional stream feeder bushing is fashioned with a floor and walls of substantial thickness in order to withstand the pressure head of molten glass contained in the feeder or bushing and to facilitate accurate temperature and viscosity control of the glass. The molten glass within the feeder or bushing is at a comparatively high temperature and hence low viscosity in order that substantially uniform streams of glass flow from the orificed projections for attenuation to fine filaments of uniform size. While the use of spaced orificed projections depending from a feeder floor reduces the tendency for the glass to flood over the surface of the feeder, under certain conditions the glass will flood along the surface of the feeder and interrupt stream flow and attenuation.

The present trend in the production of textile strands of glass filaments is to simultaneously attenuate a large number of fine filaments from streams of molten glass and combine them into a single strand. In order to attain an increased number of streams from a feeder, the size of the stream feeder or bushing must be increased. Many difficulties are encountered in increasing the feeder size, such as the tendency for the floor of the feeder to sag and the difficulties of maintaining uniform temperature and hence viscosity of a comparatively large body of glass at the stream flow section of a feeder.

The present invention embraces a method of flowing streams of glass in closely spaced relation through orifices in a feeder plate or member under temperature conditions whereby the tendency for the glass to flood over the surface of the feeder plate is substantially reduced or eliminated.

Another object of the invention resides in a method of flowing streams of glass in closely spaced relation through perforations or small openings in a plate and establishing a differential between the temperature of the plate and that of the glass at the region of stream delivery whereby flooding is substantially eliminated and discrete streams provided which may be successfully attenuated into fine filaments or fibers.

Another object of the invention resides in a method of forming fine streams of glass in closely spaced relation delivered from orifices or openings in a metal plate without the use of orificed projections and in an environment and under conditions whereby the tendency for the glass to flood over the surface of the feeder plate is substantially eliminated.

Another object of the invention resides in a method of effecting delivery of streams of glass through orifices in a plate wherein the plate is maintained at a lower temperature than that of the glass at the stream flow region and regulated pressure exerted on the glass at the stream flow region to provide streams of substantially uniform size and the glass being of a viscosity suitable for attenuating the streams into fine continuous filaments whereby flooding or the tendency of the glass to flood along the plate at the stream flow region 1 substantially eliminated.

Another object of the invention resides in the provision of an arrangement for feeding heat-softened glass to a feeder plate provided with a large number of stream flow orifices whereby the temperature and pressure of the glass at the stream flow region of the plate are controlled and the temperature of the plate maintained below the temperature of the glass at the stream flow region whereby individual or discrete streams of glass in closely spaced relation are provided which do not tend to adhere one to another whereby the streams may be successfully attenuated into fine continuous filaments.

Another object of the invention resides in the provision of a stream flow unit embodying a stream feeder plate means of planar shape having a comparatively large number of small orifices or openings in closely spaced relation and the temperature of the plate controlled to effect simultaneous delivery of streams of glass of uniform viscosity from all of the openings and wherein several stream flow units of this character may be employed concomitantly to provide a group of streams of glass from each of the units, the groups of streams being attenuated into filaments and filaments of the several groups combined to form a strand or strands by converging the groups of filaments from the several units into one or more strands, each strand containing a substantial number of continuous filaments.

Another object of the invention resides in an apparatus for forming filaments from streams of heat-softened glass wherein a comparatively thin metal plate or member is fashioned with a comparatively large number of closely spaced orifices whereby a large number of streams of glass is delivered from a small area thereby greatly reducing the cost of filament forming apparatus and providing a compact arrangement facilitating the concomitant use of several of the fiber forming units to produce one or more strands of glass filaments economically.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 2 is a sectional view illustrating the form of fiber forming apparatus of the invention shown in FIG. 1;

FIG. 3 is a bottom plan view of the arrangement shown in FIG. 2;

FIG. 4 is a bottom plan view of the stream flow member shown in FIGS. 2 and 3;

Figure 1:
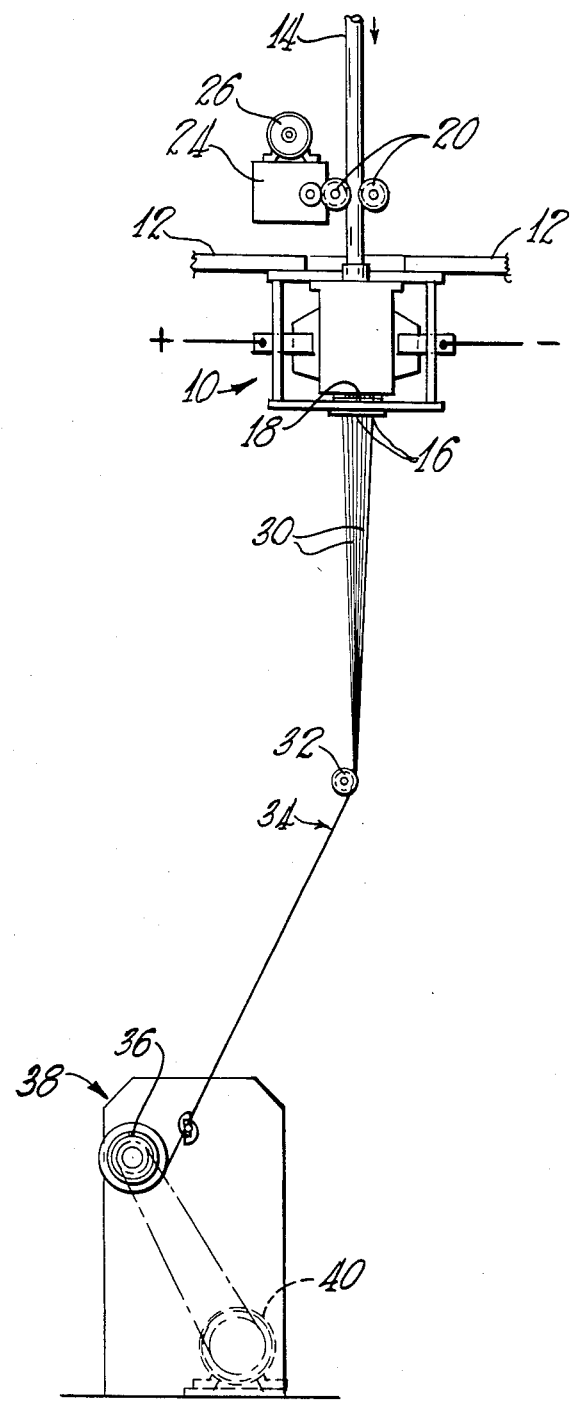
FIG. 1 is a semischematic view illustrating one form of arrangement for carrying out or performing the method of the invention in producing a strand of filaments of glass.

Referring to the drawings in detail and initially to FIG. 1, there is illustrated an arrangement or apparatus of the invention for feeding streams of heat-softened glass, the streams being drawn into fine filaments by suitable attenuating means. In the form of apparatus illustrated in FIG. 1, the stream feeding construction or unit 10 is supported by a frame construction 12, the unit 10 embodying means adapted to heat an advancing glass rod 14 to soften the glass to a mobile condition whereby streams 16 of glass are delivered through small orifices in a feeder plate or member 18.

The glass rod 14 is fed downwardly into the unit 10 at a comparatively low rate by suitable feed rolls 20 rotated through conventional transmission gearing contained in a housing 24 and driven by a motor 26. The glass rod 14 is fed at a controlled rate to exert sufficient pressure upon the heat-softened or mobile glass of the rod in the unit 10 for extruding streams of the glass through orifices in the plate 18. The speed of rotation of the feed rolls may be varied and controlled by conventional adjustable variable speed mechanism in the transmission housing 24 or by regulating the speed of the drive motor 26.

As shown in FIG. 1, the streams 16 of glass delivered or extruded through the orifices 18 are attenuated into discrete filaments 30 which are converged by a gathering shoe 32 into a group or strand 34 and the strand wound into a package upon a thin-walled packaging tube mounted on a winding mandrel 36 of a winding machine 38, the winding collet being driven in a conventional manner by a motor 40. The size of the filaments 30 may be varied by varying the size of the glass streams or modifying the linear rate at which the streams are attenuated into filaments.

It is to be understood that, if desired, the filaments may be engaged with a conventional single pull roll or engaged with nip rolls of conventional character rotated at filament attenuating speed and the filaments collected upon a conveyor to form a mat or other form for further processing.

FIGS. 2 and 3 illustrate on a larger scale the glass stream feeding apparatus of FIG. 1. The apparatus is inclusive of a tube or tubular member 44 of metallic material resistant to high temperature such as an alloy of platinum and rhodium, the tube providing a chamber to contain the glass. The internal diameter of the tube 44 is slightly larger than the diameter of the glass rod 14 providing the glass supply whereby the rod is snugly but slidably movable in the feeder chamber provided by the tube 44. Welded or otherwise secured to the lower end of the tube 44 is a circular disc or member 46.

Welded to an upper region of the tube 44 is a similar disc 48, the discs 46 and 48 being of an alloy of platinum and rhodium or other metallic material resistant to high temperatures. Also surrounding the tube 44 adjacent the disc 48 is a circular frame member 50 which is secured to and forms a component of the supporting frame structure 12. Depending from the periphery of the member 50 is a circular metal member 52 supporting an annular metal member or ring 54. Disposed adjacent and below the ring 54 is a circular disc or element 56 having a counterbore 58. The member 56 is supported from the ring 54 by bolts 57.

Disposed in contiguous contact with the platinum alloy disc 46 is a stream flow member, body or plate 60 having a perforated stream flow area 62 provided by a comparatively large number of openings or orifices 64 in the plate 60, a particularly shown in FIGS. 3 and 4, the stream flow area being in registration with the interior of the tube 44.

The stream flow plate 60 is preferably comparatively thin and is supported by a plurality of discs or washers 66 of refractory nested in the counterbore 58 in the member 56. Disposed in a circular recess 70 provided in the member 56 is a blower or nozzle construction comprising a circular member 72 having a central passage 74 which registers with the circular central openings of the insulating washers 66.

The member 72 is supported from the member 56 by screws 73. The circular member 72 is fashioned with a circular recess 76 which, with a surface 78 constituting the bottom of the recess 70, forms a circular manifold. An innermost circular region of member 56 is fashioned with a frusto-conically shaped surface 80. An inner circular portion 82 of member 72 is fashioned with a reciprocally-shaped frusto-conically shaped surface 84 which, as shown in FIG. 2, is spaced slightly from the frusto-conically shaped surface 80 to provide a circular orifice, nozzle or slot 86 for directing air from the manifold 76 upwardly into contact with the lower surface of the plate or body 60 to reduce the temperature of or cool the plate 60.

The circular manifold 76 is connected by tubes or tubular members 90 and 91 with a blower 94 or supply of air under pressure. The entrance 96 of the tubes 90 and 91 into the manifold 76 are preferably tangential, as shown in FIG. 3, to impart a spiral path of traverse to the air in the manifold and to the air delivered through the slot or orifice 86 for contact with the plate 60.

The glass of the rod 14 is heated as it moves downwardly through the tube 44 whereby the glass adjacent the plate 60 is in a softened mobile condition. In the form shown in FIG. 2, the glass of the rod 14 is heated to reduce the same to a mobile or flowable condition by resistance heating, that is, flowing electric energy through the tube 44 and the glass within the tube. Welded or otherwise joined to opposed wall regions of the tube 44 are terminals or terminal lugs 100 engaging the tube 44 throughout a substantial portion of its length. Terminal connectors 102 of conventional character are connected with the lugs 100 and with a supply of controlled electric current of high amperage and comparatively low voltage.

The flow of electric current through the tube 44 and the glass of the rod 14 is effective to progressively increase the temperature of the advancing rod 14 whereby the glass approaching the region of the plate 60 is softened and in a mobile condition, the softened glass being of a viscosity facilitating delivery of streams of the glass under pressure through the orifices 64 in the plate 60. In order to minimize heat losses from the glass and the tube 44, the tube is imbedded or embraced within high temperature resistant refractory 106 as shown in FIG. 2.

The member 56 is fashioned with a circular passage 108 to accommodate a circulating cooling fluid, such as water. Water flows into the circular passage 108 through an inlet fitting 110 and out of the passage through an outlet fitting 112, there being a baffle 114 in the passage 108 between the inlet and outlet to promote circuitous flow of cooling fluid in one direction through the circular passage 108. The cooling fluid absorbs heat from the member 56 and associated components in order to maintain them at a safe operating temperature.

The method of operation of the arrangement shown in FIGS. 1 through 4 is effective for extruding or delivering streams of heat-softened glass through the orifices 64 under conditions avoiding flooding of the glass across the lower surface of the feeder plate 60. As an example of the size and close spacing of the stream flow orifices in the plate 60, discrete streams of glass are delivered through orifices 64 of about ten thousandths of an inch in diameter, the orifices being arranged in rows, as shown in FIG. 4, and the center lines of adjacent rows being spaced about twenty five thousandths of an inch apart without encountering flooding when the plate 60 is maintained at a temperature lower than that of the glass at the stream flow region of the plate by air from the blower.

In operation, a rod of glass 14 is advanced at a controlled rate by the rotating feed rolls 20 into the tube 44 which provides a melting chamber. As the glass rod moves downwardly into the tube 44, the glass is progressively increased in temperature by electric current flow through the glass. The glass upon reaching the region 61 above and adjacent the plate 60 is softened to a sufficiently low viscosity to facilitate flow of streams of glass under pressure through the orifices 64.

In the method of operation of the arrangement shown in FIGS. 1 through 4, the speed of rotation of the feed rolls 20 is controlled or regulated so as to exert a downwardly acting pressure on the softened glass adjacent the feeder plate 60, the pressure extruding the molten glass at the region 61 through the orifices 64.

A stream of air is concomitantly delivered through the circular slot or orifice 86, the air being projected upwardly into contact with the plate 60 to continuously cool the plate whereby the plate is maintained at a temperature below the temperature of the glass in the region 61.

It is found that for a glass, such as conventional "E" glass, a temperature differential between the temperature of the softened glass at the region 61 and the temperature of the plate should be between 50° and 150°, the temperature differential being maintained substantially constant by regulating or controlling the delivery of air from the blower slot 86 by a valve or damper 95, shown in FIG. 3, in the air supply manifold. When these conditions obtain it is found that there is no flooding of the glass encountered at the lower surface of the plate 60 and the streams of glass are maintained discrete and separate even though the streams are in very close relation.

As an example of the operating temperatures in the utilization of "E" glass in forming streams for attenuation to filaments, the plate temperature may be between 2050° F. and 2100° F. with the glass at the region 61 of a temperature not less than 2150° F.

The temperature of the plate 60 may be regulated and controlled by modifying the amount of air delivered in a given unit of time through the slot 86, the amount of air being controlled by the valve or damper 95.

It is further found that the glass at the region 61 should be under pressure sufficient to effect continuous extrusion of the glass through the perforations or orifices 64 as well as to attain the desired throughput of glass per unit of time through the fiber-forming unit. It is further found that the plate 60, which preferably is an alloy of platinum and rhodium or other metal resistant to the high temperatures, may be comparatively thin being not less than 0.002 inches in thickness and preferably of a thickness of 0.005 of an inch or more depending upon the viscosity of the glass, the pressure exerted on the glass, and the temperature differential to be maintained between the plate and the molten glass adjacent the plate.

In the use of a comparatively thin stream flow plate, the perforated area is comparatively small so as to provide sufficient structural strength to withstand a downward pressure of the glass of about fifteen pounds per square inch without rupture. The pressure of the glass on the plate 60 may be between three pounds and twenty pounds per square inch. If a plate 60 of greater thickness is used, the glass pressure may be increased to secure increased throughput.

Figure 5:
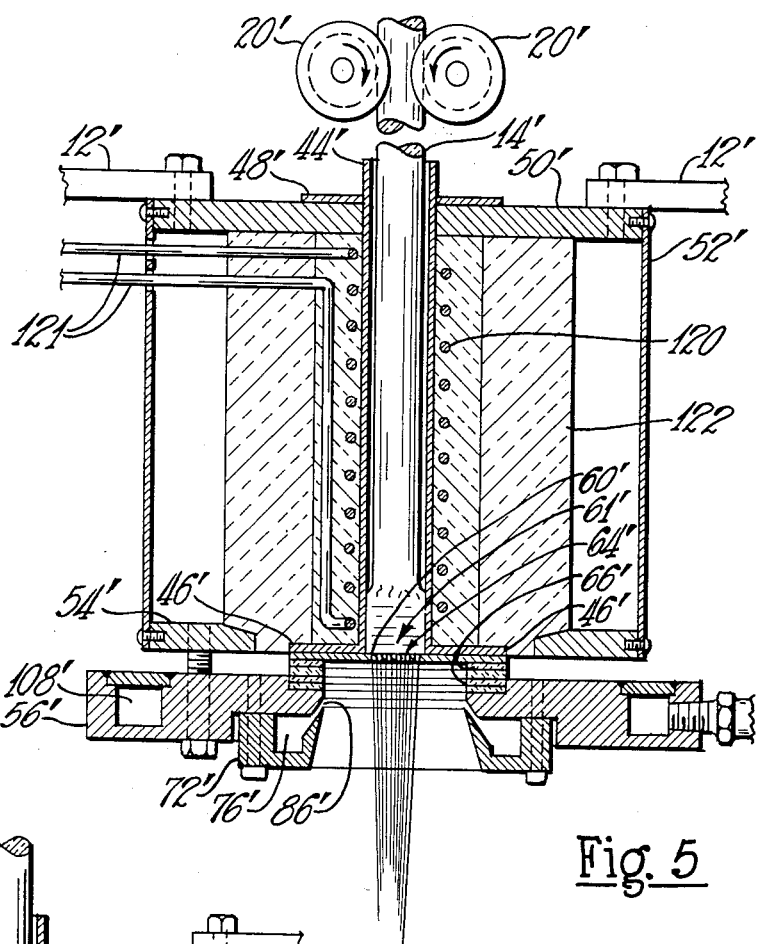
FIG. 5 is a view similar to FIG. 2 illustrating a modified arrangement of heating the glass.

FIG. 5 illustrates an arrangement similar to FIG. 2 but wherein the glass rod is heated by induction. The rod 14' of glass is delivered downwardly at a controlled rate by rotatable feed rolls 20'. The rod of glass moves through a chamber provided by a tube 44' of an alloy of platinum and rhodium or other high temperature resistant metallic material.

The frame structure supporting the stream flow unit includes frame members 12' and disc 50' engaging a circular member 48' of platinum alloy welded to the tube 44'. A circular member or sleeve 52' depending from the disc 50' supports a ring 54'.

The ring 54' supports a circular member or disc 56' and an air blower manifold 72'. A perforated stream feeder plate or member 60' is disposed contiguous with the lower surface of a disc 46' of platinum rhodium alloy welded to the lower end of the tube 44'. The central area 64' of the feeder plate 60' is provided with rows of comparatively small perforations as shown in FIG. 4, through which streams of glass are delivered in the same manner as described in connection with the form shown in FIG. 2. Wall regions of the manifold chamber 76' in the manifold 72' are fashioned with frusto-conically shaped surfaces defining an upwardly slanted circular slot or orifice 86' through which air is delivered from a blower, such as the blower shown at 94 in FIG. 3, into contact with the plate 60' to cool the plate.

The plate 60' is supported by discs or washers 66' of high temperature resistant refractory, the washers being supported by the member 56'. The member 56' has a circular passage or chamber 108' through which cooling water or other heat-absorbing fluid is circulated to maintain the disc 56' and associated components at a safe operating temperature. The tube 44' is surrounded by an inductive heating unit or coil 120 supplied with electric current from a controlled source (not shown) through current conductors 121 in a conventional manner.

The induction heater coil 120 is positioned as close as practicable to the tube 44'. The induction heating coil is surrounded by high temperature resistant refractory 122.

The operation of the arrangement shown in FIG. 4 is substantially the same as the operation of the form shown in FIG. 2. The induction heater 120 progressively increases the temperature of the glass of the advancing rod 14' whereby the lower portion of the glass of the rod is reduced to a softened flowable or mobile condition at the region 61' above the plate 60', the softened glass at the region of transition of the glass to a softened state engaging the wall of the tube 44' provides an effective seal so that constant pressure exerted on the rod 14' by the feed rolls 20' will effect extrusion of the heat-softened or flowable glass at the region 61' through the orifices at the area 64' of the plate 60'.

The air stream delivered through the circular slot 86' contacts the plate 60' and maintains the plate 60' at a temperature lower than that of the glass at the region 61'. The glass streams extruded through the orifices at the perforated region 64' form discrete streams and the glass does not flood across the lower surface of the plate 60' during attenuation of the streams to filaments.

Figure 6:
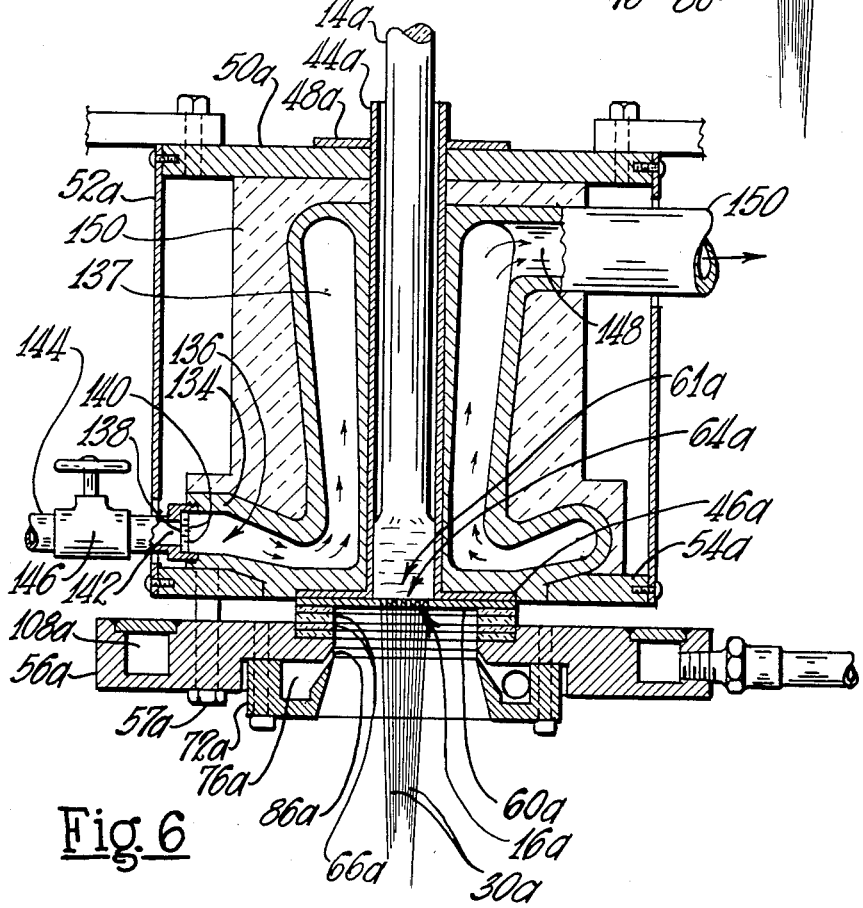
FIG. 6 is a view similar to FIG. 5 illustrating another method of heating the glass.

FIG. 6 shows an arrangement similar to FIG. 5 illustrating another method and means of heating the advancing glass rod to reduce the glass to a mobile or flowable condition at the region adjacent the stream feeder plate.

In this form the glass rod 14a is advanced by rotatable feed rolls as in the other forms of apparatus to advance the glass rod through a tube 44a fashioned of an alloy of platinum and rhodium or other suitable material. Welded to the tube 44a at its upper region is a circular disc 48a and at its lower end a similar disc 46a.

Depending from the frame component 50a is a circular wall 52a supporting an annular member or ring 54a. A circular member 56a is supported from the ring 54a by bolts 57a. The stream feeder plate 60a of the same character as shown in FIGS. 2 and 4 is supported in contiguous engaging relation with the disc 46a by annular members 66a of refractory nested in a recess provided in the member 56a. A blower manifold 72a supported by member 56a is fashioned with a manifold chamber 76a.

The innermost regions of the blower member 72a and the member 56a are shaped to provide a circular blower orifice or slot 86a through which air from the manifold chamber 76a is projected upwardly into contact with the plate 60a for cooling the plate to a temperature below that of the glass at the region 61a adjacent the plate 60a. The member 56a is provided with an annular chamber 108a to accommodate a circulating heat-absorbing fluid such as water to maintain the member 56a at a safe operating temperature.

In the form of apparatus illustrated in FIG. 6, an internal combustion burner provides the means for heating the glass of the rod 14a as it moves downwardly to reduce the lower end region of the rod to a softened or mobile state, the softened glass being of a temperature and viscosity whereby streams of the glass may be extruded through the perforated or orificed area 64a of the plate 60a. The combustion burner is of annular shape and surrounds the chamber provided by the tube 44a. The burner is fashioned with a lining preferably of refractory 134 defining an annular combustion chamber 136.

A circular rear wall 138 of the combustion chamber is formed with a plurality of small passages 140 to admit combustible mixture of fuel gas and air from an annular manifold 142, the perforated wall 138 forming a fire screen to prevent ignition of the mixture in the manifold 142. Combustible mixture is delivered to the manifold 142 from a supply through a pipe 144, a valve means 146 being disposed in the supply pipe for regulating the delivery of mixture to the burner. The mixture is introduced into the combustion chamber 136 under comparatively low pressure of about five pounds per square inch, and the mixture ignited and burned in the chamber 136.

The heat of the burning gases in the annular chamber 136 heats the glass rod 14a as it is advanced through the tube 44a, the lower end region of the glass rod being reduced to a softened or flowable condition by the heat from the chamber 136.

The gases of combustion flow upwardly through an annularly-shaped chamber 137 forming a continuation of the chamber 136, the hot gases in the chamber 137 progressively increasing the temperature of the advancing glass rod 14a. The gases from chamber 137 are exhausted from chamber 137 through one or more exhaust pipes 150 for discharge at a region remote from the burner.

In the arrangement shown in FIG. 6, the glass rod is progressively heated and becomes softened in the lower region 61a of the chamber provided by the tube 44a to a viscosity suitable for delivery under pressure through the orifices to provide the streams 16a of glass for attenuation to filaments 30a. Through the continuous delivery of a stream or jet of air through the circular orifice 86a from the manifold chamber 76a, the plate 60a is maintained at a temperature below the temperature of the molten glass in the region 61a above the plate and wetting or flooding of the lower surface of the plate by the glass is substantially eliminated or prevented. The control of the heating of the glass is exercised by manipulation of the valve 146 regulating the combustible mixture delivered into the burner chamber 136.

Figure 7:
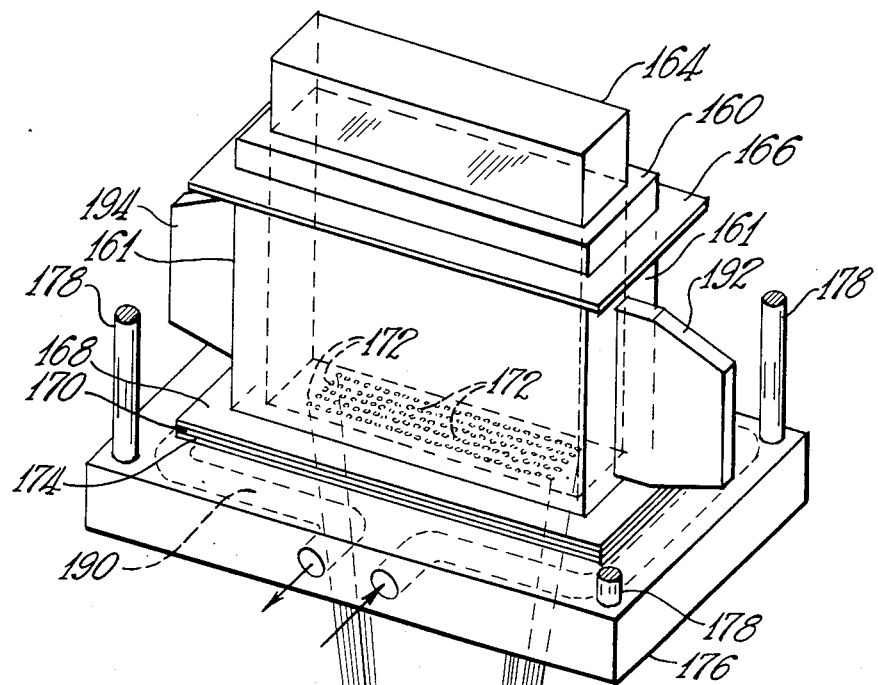
FIG. 7 is an isometric view illustrating another form of apparatus of the invention.
Figure 8:
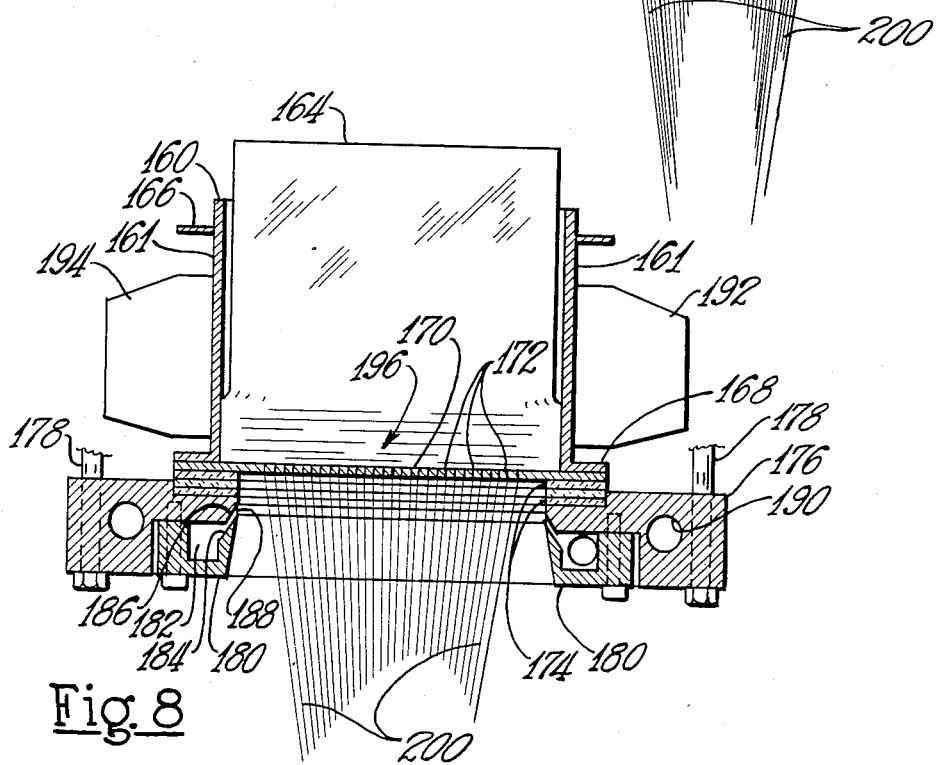
FIG. 8 is a lengthwise sectional view of the construction shown in FIG. 7.

FIGS. 7 and 8 illustrate another arrangement for carrying out the method of extruding streams of glass through closely oriented or spaced orifices in a feeder plate utilizing a substantially rectangular glass body or plate of glass as a supply, is fed toward the feeder plate and the glass being progressively increased in temperature as it is fed or advanced toward the stream feeder plate and reduced to a softened or mobile state at a region above and adjacent the feeder plate.

In this form the chamber receiving and containing the glass is provided by a tubular member 160 formed of an alloy of platinum and rhodium or other high temperature resistant material, the member being of substantially rectangular cross section.

The interior dimensions of the tubular member 160 are such as to snugly, yet slidably, receive and accommodate a glass supply in the form of a glass plate 164 which may be advanced into the tube 160 by conventional feed rolls (not shown) engageable with opposed wall surfaces of the glass body and driven at a controlled rate to advance the glass body into the tube at the rate at which the glass is extruded or delivered through orifices in a feeder plate. Surrounding the upper region of the tube 160 is a laterally extending rectangular shaped collar 166 which may be secured to frame members such as frame members 12 shown in FIG. 2 for supporting the tube 160.

A similar rectangular shaped member 168 is disposed at the lower end of the tube 160 and is preferably welded to the lower end of the tube. A stream feeder plate 170 is contiguous with the lower surface of the member 168, the region of the member 170 in registration with the interior of the tube 160 being fashioned with rows of small orifices 172 in closely oriented or spaced relation. The orifices 172, for example, may be about ten thousandths of an inch in diameter arranged in rows about twenty-five thousandths of an inch between centers of adjacent orifices in a row, and the rows spaced on center lines about twenty-five thousandths of an inch apart.

Disposed beneath the feeder plate 170 are spacers or rectangularly-shaped washers 174 of refractory which are nested in a suitable recess in a rectangularly-shaped member 176 suspended from the frame members by supports or rods 178. A substantially rectangular blower member 180 is disposed in a recess in the member 176, the blower being of substantially the same general construction as the blower illustrated in FIG. 2 but is of rectangular shape.

The blower member 180 is fashioned with a manifold chamber 182 provided with interior angularly disposed surfaces 184 which with angularly disposed surface 186, fashioned on member 176, provides a slot or orifice 188 of substantially rectangular configuration to deliver a stream of air onto the plate 170 to cool the plate. The rectangular member 176 is provided with a peripheral passage or chamber 190 preferably of rectangular shape by reason of the rectangular shape of the member 176. The passage or chamber 190 accommodates circulating cooling fluid to maintain the member 176 at a safe operating temperature.

In this arrangement the end walls 161 of the rectangular tube 160 are provided with terminal lugs 192 and 194 for connection with current supply conductors for supplying electric current to the tube 160 for heating the body of glass 164 being fed downwardly through the tube 160. The current supply to the terminals 192 and 194 is controlled by conventional means to regulate the heating of glass of the body 164 whereby the lower region of the glass 196 adjacent the feeder plate 170 is in a softened and mobile condition. The tube 160 may be surrounded with refractory (not shown) to minimize heat losses.

In the operation of the arrangement shown in FIGS. 7 and 8, the preformed glass plate is advanced by feed rolls (not shown) at a controlled rate and the heating of the glass through the flow of electrical energy through the tube 160 and the glass progressively increases the temperature of the glass during its downward movement so that as it approaches the plate 170, the glass is in a softened or mobile condition.

The feed rolls exert pressure on the glass body 164 whereby pressure is exerted on the softened glass at the region 196 adjacent the plate 170 whereby streams of glass are extruded through the orifices 172 in the feeder plate 170. As the stream of air delivered through the orifice 188 continuously contacts the plate and maintains the plate at a reduced temperature, the glass does not flood across the surface of the plate and the streams remain discrete even though they are in closely oriented relation.

The streams may be attenuated to filaments 200 by winding the filaments in a strand form upon a rotating collector of the character shown in FIG. 1, or attenuated by other means, such as a pull roll or nip rolls, in a well known conventional manner. Through the arrangement shown in FIGS. 7 and 8, a comparatively large glass stream flow area is provided in the plate 170 and as the perforated area of the plate is comparatively narrow, being about the width or thickness of the glass plate or body 164, the plate will withstand the feed pressure exerted on the glass plate without fracturing. The throughput of glass is substantially increased through the use of a plate or rectangular body of glass as the glass supply.

Figure 9:
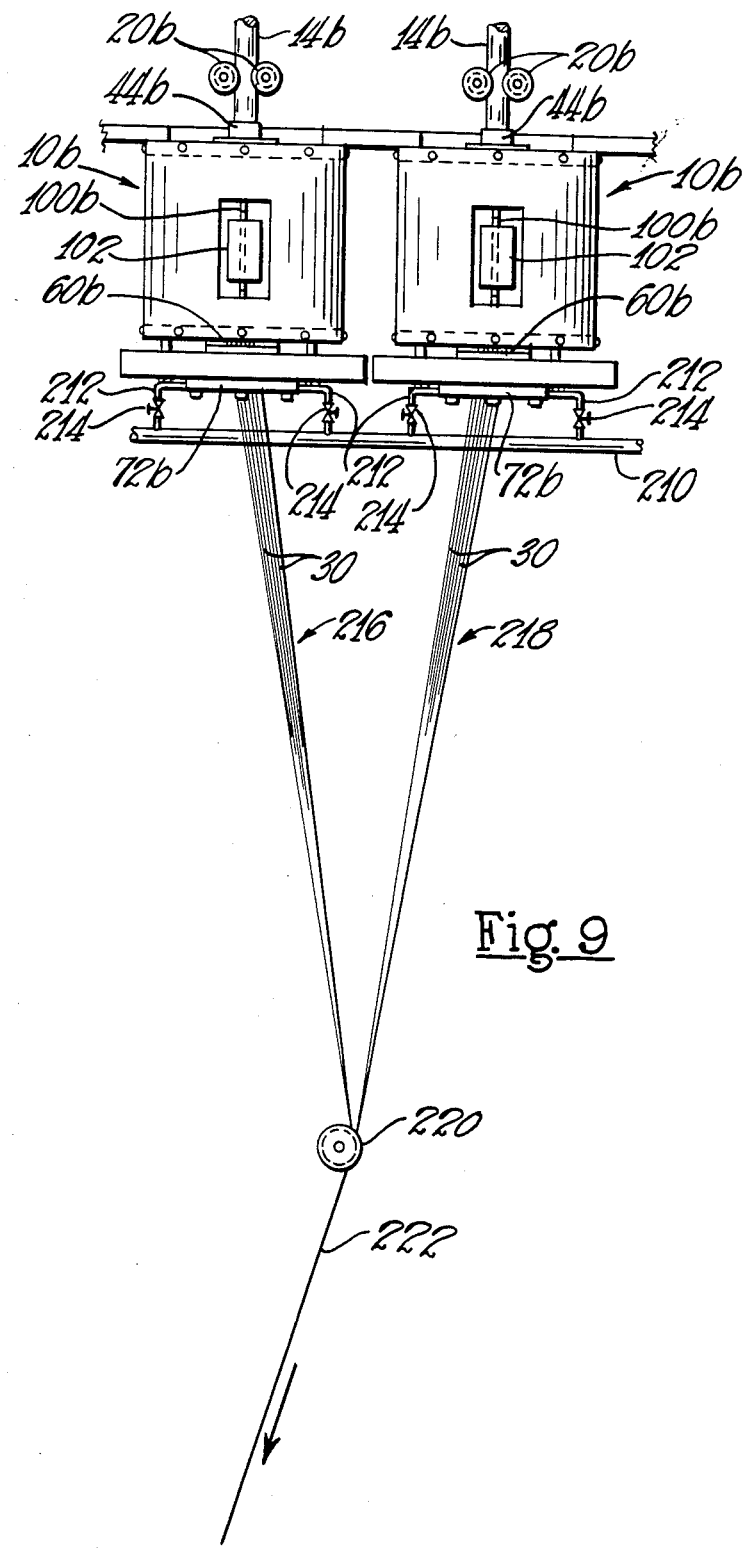
FIG. 9 illustrates a plurality of fiber forming units shown in FIG. 2 utilized for forming a multifilament strand having a comparatively large number of filaments.

FIG. 9 illustrates the use of a plurality of fiber-forming units 10b of the character illustrated in FIGS. 2 and 3 providing for the concomitant attenuation of a plurality of groups of streams of glass extruded from a plurality of fiber-forming units. Each unit 10b is supplied with a glass rod or body 14b delivered by pairs of feed rolls 20b fed into the chambers provided by the tubular members 44b, the glass being heated by electric energy delivered through current supply conductors connected with the terminal lugs 100b, the blower manifold members 72b may be supplied with air from a blower through an air manifold pipe 210 connected with an air blower of the character shown at 94 in FIG. 3, or other supply of air under pressure.

Air from the supply pipe 210 is delivered to each blower through branch pipes 212. The air delivered to each blower may be regulated or controlled by valve means 214 associated with each of the branch pipes 212. Each unit 10b is provided with a feeder plate 60b of the character shown at 60 in FIG. 2 for delivering a group of glass streams in closely spaced relation from the feeder plate of each unit. The streams are attenuated to filaments 30.

The groups 216 and 218 of filaments may be converged by a gathering shoe 220 to form a strand 222 comprising the filaments of the several groups, the strand 222 being collected upon a winding collet in the conventional manner. If desired, the individual groups may provide individual strands which may be concomitantly wound upon dual collectors or tubes of a winding machine to form two independent packages.

Figure 10:
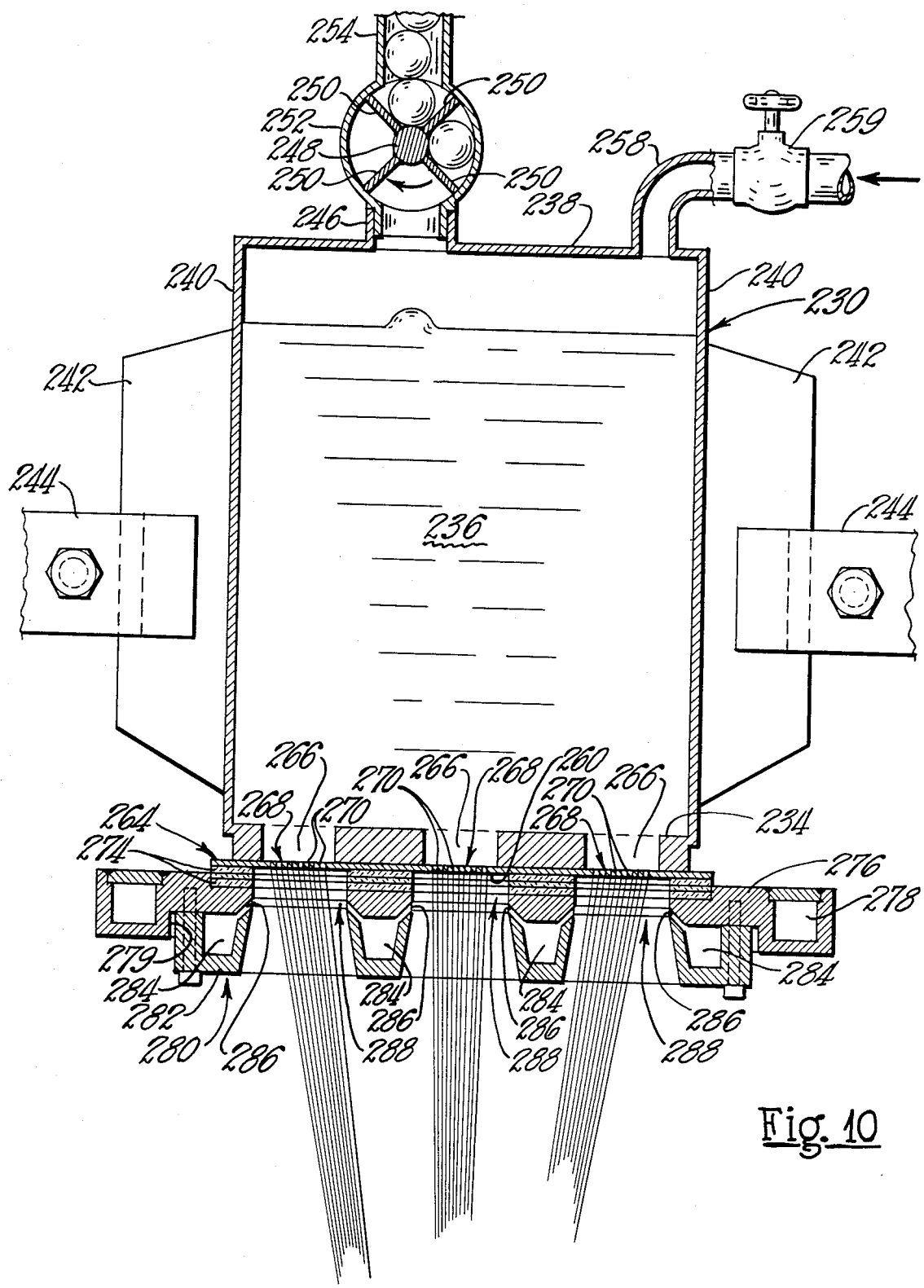
FIG. 10 is a sectional view illustrating a modified form of stream flow apparatus of the invention.

FIG. 10 illustrates another form of apparatus for performing or carrying out the method of the invention. In this arrangement the glass supply is maintained in a heat-softened condition at a temperature and viscosity wherein the glass may be readily extruded through one or more groups of orifices in a plate which is maintained at a temperature less than that of the heat-softened glass adjacent the plate. A walled receptacle 230 for containing the glass, in the embodiment illustrated, is of substantially rectangular shape but may be of circular or oval configuration if desired.

The receptacle 230 is provided with a floor or bottom section 234 and with a cover or closure 238 to facilitate pressurizing the receptacle. The end walls 240 of the receptacle are provided with terminal lugs 242 for connection with current conductor terminals 244 supplying electric current to the receptacle and the glass therein for melting or heat-softening the glass and maintaining the softened glass at a proper viscosity for forming the glass streams.

In the embodiment illustrated, the cover 238 is provided with a tubular fitting 246 equipped with means for metering or controlling the delivery of pieces of glass, such as glass marbles, into the receptacle 230. The gating or metering means is of conventional character and comprises a rotatable shaft 248 equipped with gates or vanes 250 contained within a cylindrically-shaped housing member 252, the gates or vanes 250 snugly fitting against the inner wall of the housing 252 to provide a seal. The pieces or marbles of glass are fed to the metering means from a supply (not shown) through a tube 254 in a well known conventional manner.

Also connected with the cover 238 or with the receptacle at a region above the level of glass in the receptacle is a pipe 258 connected with a supply of air or other gas under pressure for maintaining pressure above atmospheric pressure in the receptacle 230 for extruding the glass through orifices in a feeder plate. The pressure may be controlled by a valve 259 associated with the pipe 258. Positioned contiguous and in contact with a lower surface 260 of the receptacle floor 234 is a stream feeder plate 264. The floor 234 is fashioned with spaced passages 266 through which glass is delivered to perforated or orificed regions of the plate 264.

Disposed in registration with each of the passages 266 are perforated regions 268 of the plate 264, each region comprising a comparatively large number of small orifices 270 through which the glass is extruded from the feeder chamber 236. Positioned beneath the stream feeder plate 264 is a series of stacked members 274 of refractory which are supported by a member 276. The member 276 is provided with a chamber 278 accommodating cooling fluid to maintain this member at a safe operating temperature. The member 276 is provided with a recess 279 accommodating a blower construction 280.

The blower comprises a member 282 fashioned with a series of circular manifold chambers 284, the member 276 and the blower member 280 having pairs of cooperating frusto-conically shaped surfaces providing circular orifices 286 bounding passages 288 in the blower member 282, a passage 288 being in registration with each of the passages 266 of the floor 234 of the receptacle 230.

The manifold chambers 284 are connected with a supply of air under pressure such as the blower 94 shown in FIG. 3 or other compressed air supply. Air streams are delivered through the circular orifices or slots 286 into contact with the lower surface areas of the plate 264 at the perforated regions 268 to reduce the temperature of or cool the plate 264.

In this form of the invention, glass marbles are fed at a controlled rate through the marble gating or metering means 250 and the glass reduced to a softened or mobile condition by electric current flowing through the receptacle 230 and the glass therein. Air or other gas at a constant pressure is admitted through the tube 258 thereby pressurizing the glass under sufficient pressure to extrude streams of the glass simultaneously through the orifices 270 at the perforated regions 268 in the plate 264.

The streams of glass delivered from each of the perforated areas 268 may be attenuated to fine filaments and the groups of filaments from the several areas converged into a strand and the strand wound into a package in the manner described in connection with FIG. 1, or the groups of filaments derived from attenuation of the groups of streams may be converged to form two or more strands. Through the arrangement illustrated in FIG. 10, a substantial throughput of glass is attained through the use of several groups of stream feeder orifices thereby rendering the process economical. The use of the stream feeder plate maintained at a temperature below that of the glass avoids flooding of the glass at the lower surface areas of the plate at the stream feeder regions.

Figure 11:
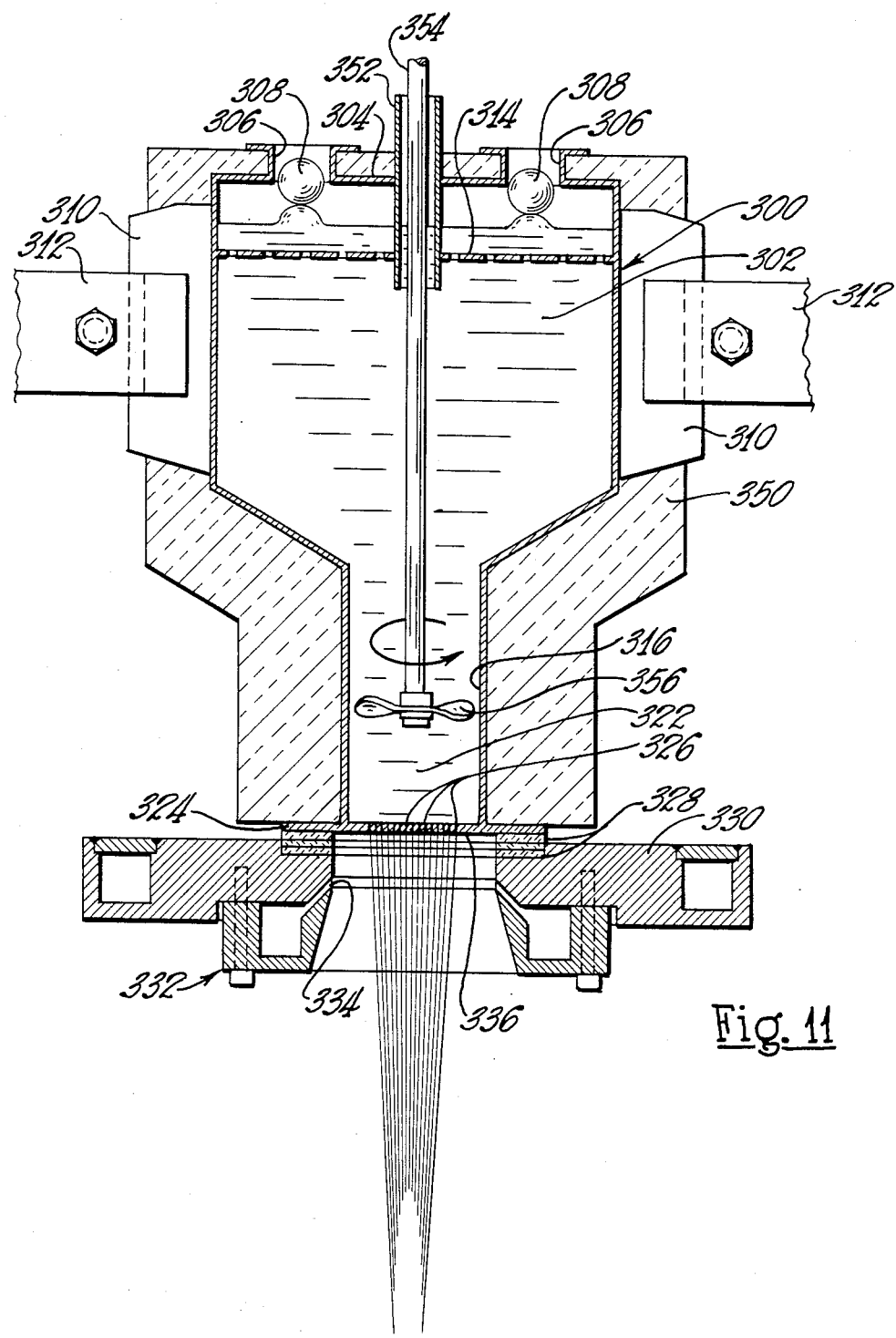
FIG. 11 is a sectional view illustrating a further form of stream flow apparatus.

FIG. 11 illustrates another form of apparatus for carrying out or performing the method of the invention, the apparatus embodying mechanical means for pressurizing the heat-softened glass for extruding the glass through openings in a stream feeder plate. The arrangement includes a walled receptacle 300 providing a melting chamber 302, the receptacle being fashioned of an alloy of platinum and rhodium or other high temperature resistant metallic material. The receptacle 300 is provided with a cover 304 equipped with tubes 306 through which bodies or marbles of glass are introduced or fed into the chamber 302.

Each of the tubes 306 is connected with metering means such as that shown in FIG. 10 for regulating and controlling the delivery of bodies or marbles 308 of glass into the chamber 302. In the arrangement shown in FIG. 11, the receptacle 300 is heated by electric current for reducing the glass to a molten or mobile condition. Secured to opposite wall regions of the receptacle 300 are terminals or lugs 310 engaged by current supply conductors 312 connected with a source of electric energy for heating the receptacle, the electric current being regulated by well known conventional means (not shown). A perforated, current conducting heater strip 314 extends across the chamber 302 below the level of the glass to promote heating of the glass.

The receptacle 300 is fashioned with a tube or tubular extension 316 of circular cross section, the tube being of platinum and rhodium alloy and joined to the floor of the receptacle.

In this form the floor on floor portion 324 of the receptacle is the stream feeder plate or member and may be an integral portion of the tube 316, the latter providing a cylindrically-shaped chamber 322 containing heat-softened glass. The floor or stream feeder plate 324 is provided with a group of small orifices 326 similar to the group of orifices in the plate 60 shown in FIGS. 2 and 4.

The floor or feeder plate 324 is engaged by annular members 328 of refractory, the members 328 being supported in a recess in a member 330 of the same character as the member 56, shown in FIG. 2. A blower construction 332 of the character shown in FIG. 2 is supported by a member 330 for delivering a stream or jet of air through a circular orifice 334 into contact with the lower surface 336 of the stream feeder plate 324 to cool the plate. The member 330 is supported by suitable frame means (not shown).

The receptacle 300 and the tubular extension 316 are surrounded with refractory 350 to minimize heat losses. The cover 304 is fashioned with an opening accommodating a tubular fitting 352 through which extends a rotatable shaft 354. The end region of the shaft extends into the chamber 322 provided by the tube 316 and is equipped with an impeller 356 of conventional construction, the tips of the impeller blades or van being disposed close to the wall of the tube 316 but being rotatable therein in a direction to exert downward pressure on the softened glass in the chamber 322.

The shaft 354 and impeller are driven by an electrically energized motor (not shown) of conventional character. The speed or rotation of the shaft 354 may be varied and controlled by conventional speed reducing mechanism associated with the drive motor or by regulating the speed of the motor. Through this arrangement the rotation of the impeller 356 exerts a constant pressure on the softened glass in the chamber 322 whereby the glass is extruded in streams through the small orifices 326 in the stream feeder plate 324. The downwardly directed pressure on the glass established by rotation of the impeller 356 may be varied and controlled by regulating the speed of rotation of the impeller.

In the operation of the arrangement shown in FIG. 11, pieces or marbles of glass or glass batch are fed through the tubes 306 into the chamber 302 at a controlled rate equal to the throughput of glass through the orifices 326. Air under pressure is supplied to the manifold of the blower 332 and a jet or stream of air delivered into contact with the stream feeder plate 324 to reduce the temperature of the plate of from fifty degrees to one hundred fifty degrees below the temperature of the softened glass adjacent the feeder plate in the chamber 322.

Electric energy is supplied to the receptacle 300 and heater strip 314 to reduce the pieces, marbles or glass batch to a softened or viscous molten condition, the rate of melting or softening of the glass being controlled by regulating electric current flow to the chamber 300.

The pressurizing impeller 356 is rotated at a speed to develop a downwardly acting constant pressure on the glass in the region 322 whereby the glass is extruded through the orifices 326 in fine streams which are attenuated to filaments in the manner illustrated in FIG. 1.

The reduction in temperature or cooling of the plate 324 enables continuous delivery of streams of glass through the orifices 326 without flooding of the glass over the surface of the plate 324 whereby the glass streams are maintained in discrete form for attenuation to continuous filaments.

The method of the invention is performed or carried out through the establishment and coordination of particular operating characteristics and conditions whereby streams of glass may be successfully extruded through closely spaced orifices or openings in a metal body or plate wherein the plate is maintained at a temperature below that of the glass adjacent the stream flow region of the plate and the glass pressurized whereby discrete streams are formed which may be attenuated to filaments and without flooding the obverse surface of the stream feeder body or plate.

While the reasons for and principles involved in attaining a nonwetting condition may not be fully understood, there are numerous factors or relationships that have been found to be instrumental in promoting flow of streams of glass without encountering wetting of the stream flow area of a feeder plate during operation and the maintenance of the streams in independent or discrete form so as to facilitate their attenuation to filaments. It has been found that several factors or conditions have a bearing upon attaining a nonwetting environment.

One of the factors involves the continuous dissipation of heat energy from the stream delivery region or section of the stream feeder plate to establish a substantial temperature differential between the softened glass adajcent the plate and the stream delivery surface of the plate. As previously mentioned herein, the temperature of the feeder plate should be between 50° F. and about 150° F. lower than the glass temperature. Another factor bearing upon the success of the method is the maintenance of a proper temperature and hence viscosity of the softened glass at the stream flow section of the plate.

It has been found by test that the viscosity of the glass should be such that the glass is in a mobile state but of a viscosity high enough that streams of the glass will not readily flow through the orifices under the influence of gravity but requires comparatively low pressure to extrude the softened glass through the orifices to provide the glass streams. It is found that a pressure on the softened glass is required not only to extrude the glass through the orifices but is one of the factors in promoting the nonwetting characteristic.

It has been found by tests that different degrees of tendency toward nonwetting are in a measure dependent on variations in pressure on the glass. Pressures between five pounds per square inch and twenty pounds per square inch in association with other factors will result in continuous stream delivery with virtually no tendency toward wetting of the feeder plate surface or interadhesion between adjacent streams even though they are in close relation. The reduced temperature of the plate has a higher contact angle with glass and this factor tends to reduce "wet out".

There are several energies or energy factors believed to be involved in the attainment of satisfactory nonwetting characteristics. Among these energies are the interface energy between the metal of the stream feeder plate and the glass, interface energy between the metal and the air stream directed onto the plate for cooling the plate, and the interface energy between the air and the glass at the stream delivery region. It is believed that a proper balance of these energies or forces results in a stable condition fostering a nonwetting or nonflooding tendency. An imbalance of the energies promotes different degrees of wetting of the feeder plate fostering different degrees in the tendency for flooding to occur.

Another factor that is believed to bear upon the operation of the method is the "wet out" time or rate, this being the time factor within which the molten glass is enabled to move or migrate onto or in contact with an adjacent surface. It has been found that where the softened glass is at a comparatively low temperature but of a viscosity at which it will migrate or flow, that the "wet out" time or rate, that is, its rate of migration or movement is decreased and hence its faculty for flooding is likewise diminished.

Another factor bearing upon the "wet out" rate or time is the pressure on the glass tending to extrude or force the glass through the orifices in the feeder plate. It is found that if the pressure on the glass is increased, the velocity of the glass extruded through the orifices is increased, thus reducing the "wet out" rate and thereby promoting a nonflooding condition. Furthermore, the high discharge velocities of the glass through the small size orifices provide a substantial increase in throughput for the desired fiber diameter as compared with the throughput of conventional larger orifices at reduced glass velocity.

From the results of tests in the use of stream feeder plates of varying thicknesses, it is found that satisfactory nonwetting or nonflooding condition is attained with a lesser amount of pressure on the glass when a comparatively thin feeder plate is employed. For example, if the stream feeder plate is increased in thickness, then the pressure should be increased in order to attain the same velocity of flow of the glass through the orifices in order to provide the same "wet out" rate attained through the use of a thinner plate and less glass feed pressure.

In operation, it is found that where heat energy is being removed or transferred from the stream feeder plate at a substantially constant rate as by directing an air stream into contact with the plate as hereinbefore described, the extruded streams remain individual and discrete and may be successfully attenuated into filaments. It is found that when heat is not removed or transferred from the plate at a constant rate as, for example, when the air stream is interrupted, the glass readily floods the orificed area of the feeder plate resulting in the streams becoming joined into a single body.

However, when delivery of the air stream is restored and the glass body manually pulled downwardly, the glass immediately separates into discrete or independent streams and no further tendency toward flooding is encountered so long as the feeder plate is maintained at a reduced temperature and the other operating conditions such as the proper temperature and the viscosity of the glass and the proper pressure maintained on the glass to extrude the streams through the orifices. The rate of extrusion of the glass through the orifices must be constant and coordinated with the linear rate of attenuation of the streams to filaments in order to secure filaments of uniform size.

It is apparent that, within the scope of the invention, modifications and different arrangements may be made other than as herein disclosed, and the present disclosure is illustrative merely, the invention comprehending all variations thereof.

I claim:

1. A method of forming glass fibers which comprises:
   a. passing separate streams of molten glass through an orifice plate integrally incorporated into an electrically heated fiberizing bushing, said orifice plate having at least four rows of orifices therein, with orifices being spaced in flooding relationship;
   b. drawing fibers from cones of molten glass formed at each said orifice; and
   c. directing a bulk flow of rapidly moving air upwardly to the orifice area in said plate in an amount, velocity and angle sufficient:
      i. to cool said cones to provide a stable cone formation and to maintain separation of cones thus preventing flooding;
      ii. to impinge on said plate essentially to eliminate stagnant air adjacent said plate and to cause air to move along said plate in all directions; and
      iii. to supply a source of air sucked downwardly by the fibers and substantially eliminate ambient air drawn into the region of the fiber cones.

2. A method of forming glass fibers which comprises:
   a. passing separate streams of molten glass through a generally flat orifice plate heated by orifice plate heating means, said orifice plate having at least 4 rows of orifices therein at a density of at least about 50 orifices per square inch;
   b. drawing fibers from cones of molten glass formed at each said orifice; and
   c. directing a bulk flow of rapidly moving gas upwardly to the orifice area in said plate, in an amount, velocity and angle sufficient:
      i. to cool said cones to provide a stable cone formation and to maintain separation of cones thus preventing flooding;
      ii. to impinge on said plate essentially to eliminate stagnant gas adjacent said plate and to cause gas to move along said plate in all directions; and
      iii. to supply a source of gas sucked downwardly by the fibers and substantially eliminate ambient gas drawn into the region of the fiber cones.

3. An apparatus for manufacturing glass fibers comprising:
   a. means for containing a head of molten glass;
   b. an orifice plate having orifice plate heating means, said orifice plate having at least four rows of orifices therein, with orifices being spaced in flooding relationship through which said glass fibers are drawn, said plate being constructed of a heat resistant material and being disposed at the base of said containing means;
   c. means for controlling the temperature of said plate;
   d. means for withdrawing said filaments from said plate forming cones at said orifices; and
   e. means disposed below said plate and being in communication with a gas supply for directing a flow of rapidly moving nonreducing gas upwardly:
      i. to cool molten glass cones disposed below the orifices to provide a stable cone formation and to maintain separation of cones thus preventing flooding;
      ii. to impinge on said plate essentially to eliminate stagnant gas adjacent said plate and to cause gas to move along said plate in all directions; and
      iii. to supply a source of gas sucked downwardly by the fibers.

4. The method of forming glass fibers including maintaining a body of heat-softened glass at a perforated planar area of a thin metallic plate, moving the glass through the perforations to form streams of glass, directing a stream of air upwardly into contact with the perforated area of the plate for transferring sufficient heat away from the plate to keep the temperature of the plate at least fifty degrees Fahrenheit lower than the temperature of the body of heat-softened glass adjacent the plate to promote the delivery of discrete streams of glass from the perforations without flooding of the glass at the perforated planar area, the glass from the perforations flooding the perforated planar area in the absence of the stream of air, and attenuating the streams of glass to fibers.

5. The method of forming glass fibers including maintaining a body of heat-softened glass at perforations in a planar floor of a chamber, moving the heat-softened glass through the perforations to form streams of the glass, directing a stream of air upwardly into contact with the perforated planar floor, regulating the flow of air of the air stream to cool the perforated planar floor to a temperature in a range of between fifty and one hundred fifty degrees Fahrenheit below that of the body of heat-softened glass adjacent the perforated floor to promote flow of discrete streams of glass from the perforations without flooding of the planar floor, the glass moving from the perforations tending to flood over the exterior surface of the perforated floor in the absence of the air stream, and attenuating the discrete streams to fibers.

6. Apparatus for forming glass fibers including, in combination, means providing a chamber for containing glass, said chamber having a thin planar floor provided with a group of closely-spaced perforations through which flow streams of glass, means for heating the glass in the chamber to maintain the glass adjacent the perforations in a softened condition, means establishing pressure of the glass, a blower including a manifold disposed below and adjacent the floor and encircling the streams of glass, said manifold containing air under pressure, said manifold having discharge orifice means directing a stream of gas from the manifold upwardly into contact with the floor at the region of the perforations for conveying heat away from the floor to maintain the floor at a temperature lower than that of the glass adjacent the floor, means for regulating the flow of air from the orifice means for maintaining the temperature of the perforated floor in a range between fifty and one hundred degrees Fahrenheit below the temperature of the softened glass at the floor area, and means for attenuating the glass streams to fibers.

7. The combination according to claim 6 wherein the orifice means is configured to provide an annularly-shaped air stream.

8. The method of forming glass fibers including maintaining a body of heat-softened glass at a perforated planar surface area of a metallic plate with the perforation delivery outlets all located at the planar surface, moving the heat-softened glass through the perforations to form discrete streams of glass, directing upwardly into contact with the perforated planar surface of the plate a flow of air at such a velocity and such a volume as to cool the plate to a temperature in a range from fifty to one hundred fifty degrees Fahrenheit below the body of molten glass and thereby to promote from the outlets of the perforations the delivery of discrete streams of glass that would otherwise flood across the perforated planar surface in the absence of the flow of air, and attenuating the streams of glass to fibers.

9. The method of forming glass fibers including maintaining a body of molten glass at one side of a perforated thin metallic plate with the perforation outlets all located at a planar surface area at the opposite side of the plate, moving the glass through the perforations, directing upwardly into contact with the perforated planar surface area of the plate a flow of air at such a velocity and such a volume as to cool the plate to a temperature below that at which the molten glass being flowed from the perforations will flood over the planar surface area and thereby to promote the delivery of discrete streams of glass from the perforations without flooding of the glass at the perforated planar area, and attenuating the streams of glass to fibers, the molten glass being flowed from the perforations at such a temperature and in such closely spaced relation so as to flood over the planar surface in the absence of the air flow.

10. The apparatus of claim 6 in which the perforations in the planar floor have a diameter of about ten thousandths of an inch and are located with their centers spaced apart about twenty five thousandths of an inch.

11. The apparatus of claim 6 in which the planar floor has a thickness of between twenty to fifty thousandths of an inch.

12. The method of forming glass fibers including maintaining a body of heat-softened glass at one side of a perforated planar metallic plate having the perforation delivery outlets all located at a planar surface at the opposite side of the plate, moving the heat-softened glass through the perforations to form discrete streams of glass at the perforated planar surface of the plate, directing into contact with the perforated planar surface of the plate a flow of air to cool the plate to a temperature in a range of from fifty to one hundred fifty degrees Fahrenheit below that of the body of heat-softened glass and thereby to promote the delivery from the perforations of discrete streams of glass that would flood across the perforated planar surface of the plate in the absence of the flow of air, and attenuating the streams of glass to fibers.

13. A method of forming glass fibers which comprises:
  a. passing separate streams of molten glass through an orifice plate heated by orifice plate heating means, said orifice plate having at least four rows of orifices therein, with orifices being spaced in flooding relationship;
  b. drawing fibers from cones of molten glass formed at each said orifice; and
  c. directing a bulk flow of rapidly moving gas upwardly to the orifice area in said plate, said bulk flow being directed at the cone and plate area, in an amount, velocity and angle sufficient:
    i. to cool said cones to provide a stable cone formation and to maintain separation of cones thus preventing flooding;
    ii. to impinge on said plate essentially to eliminate stagnant gas adjacent said plate and to cause gas to move along said plate in all directions; and
    iii. to supply a source of gas sucked downwardly by the fibers and substantially eliminate ambient gas drawn into the region of the fiber cones.

* * * * *